US011037546B2

(12) United States Patent
Lee

(10) Patent No.: US 11,037,546 B2
(45) Date of Patent: Jun. 15, 2021

(54) NUDGING NEURAL CONVERSATIONAL MODEL WITH DOMAIN KNOWLEDGE

(71) Applicant: Microsoft Technology Licensing, LLC, Redmond, WA (US)

(72) Inventor: Sungjin Lee, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 16/192,498

(22) Filed: Nov. 15, 2018

(65) Prior Publication Data

US 2020/0160841 A1    May 21, 2020

(51) Int. Cl.
| | |
|---|---|
| G10L 15/06 | (2013.01) |
| G06F 16/332 | (2019.01) |
| G06N 5/04 | (2006.01) |
| G10L 15/16 | (2006.01) |
| G10L 15/18 | (2013.01) |

(52) U.S. Cl.
CPC ........ G10L 15/063 (2013.01); G06F 16/3329 (2019.01); G06N 5/04 (2013.01); G10L 15/16 (2013.01); G10L 15/18 (2013.01); *G10L 2015/0635* (2013.01)

(58) Field of Classification Search
CPC .................................................. G06F 16/3329
See application file for complete search history.

(56) References Cited

U.S. PATENT DOCUMENTS

| | | | |
|---|---|---|---|
| 8,095,480 B2 | 1/2012 | Kristal et al. | |
| 10,593,346 B2 * | 3/2020 | Van Gysel | ............ G10L 15/16 |
| 2010/0042404 A1 | 2/2010 | Gupta et al. | |
| 2014/0052444 A1 | 2/2014 | Roberge | |
| 2016/0260029 A1 | 9/2016 | Gelfenbeyn et al. | |
| 2017/0199866 A1 | 7/2017 | Gunaratna et al. | |
| 2017/0323636 A1 * | 11/2017 | Xiao | ........................ G06N 3/08 |
| 2018/0025726 A1 | 1/2018 | Gatti de Bayser et al. | |

(Continued)

FOREIGN PATENT DOCUMENTS

| | | |
|---|---|---|
| JP | H02178688 A | 7/1990 |
| WO | 2017030006 A1 | 2/2017 |

OTHER PUBLICATIONS

"Project Conversation Learner", Retrieved from https://labs.cognitive.microsoft.com/en-us/project-conversation-learner, Retrieved on: Oct. 4, 2018, 3 Pages.

(Continued)

*Primary Examiner* — Abul K Azad

(57) ABSTRACT

Examples of the present disclosure describe systems and methods utilize domain knowledge to influence a selection of a candidate action template in a neural conversation model. More specifically, natural language rules may be provided to a natural language rule inferencer to bias a selection of a candidate action template. In some instances, the natural language rules may include a user input and a system action. In other instances, the natural language rules may include a previous system action and a next system action. A biasing vector may then influence a selection of a candidate action template of a set of candidate action templates to determine a most relevant candidate action template based on the natural language rules, the candidate action templates, and the user utterance or other system input.

20 Claims, 13 Drawing Sheets

(56) References Cited

U.S. PATENT DOCUMENTS

2018/0260680 A1 9/2018 Finkelstein et al.
2018/0367475 A1 12/2018 Galley et al.
2019/0295537 A1* 9/2019 Sapugay ............... G06N 20/00

OTHER PUBLICATIONS

"Rasa: Open Source Conventional AI", Retrieved from https://rasa.com/, Retrieved on: Oct. 4, 2018, 11 Pages.
Earlier, et al., "Training Dialogue Systems with Human Advice", In Proceedings of 17th International Conference on Autonomous Agents and MultiAgent Systems, Jul. 10, 2018, 9 Pages.
Bordes, et al., "Learning End-to-End Goal-Oriented Dialog", In Journal of the Computing Research Repository, May 24, 2016, pp. 1-15.
Cho, et al., "Learning phrase representations using RNN encoder-decoder statistical machine translation", In Journal of Computing Research Repository, Jun. 3, 2014, 15 Pages.
Eric, et al., "Key-Value retrieval networks for task-oriented dialogue", In Journal of Computing Research Repository, May 15, 2017, pp. 1-13.
Glorot, et al., "Understanding the difficulty of training deep feedforward neural networks", In Proceedings of 13th International Conference on Artificial Intelligence and Statistics vol. 9, Mar. 31, 2010, pp. 249-256.
Hochreiter, et al., "Long Short-Term Memory", In Journal of Neural computation, vol. 9, Issue 8, Nov. 15, 1997, pp. 1-32.
Hsien, et al., "A Network-based End-to-End Trainable Task-Oriented Dialogue System", In Journal of Computing Research Repository, Apr. 15, 2016, 11 Pages.
Jokinen, et al., "Spoken dialogue systems", In Journal of Synthesis Lectures on Human Language Technologies, vol. 2, Issue 1, Jan. 1, 2009, pp. 1-151.
Kingma, et al., "Adam: A method for stochastic optimization", In Journal of the Computing Research Repository, Dec. 22, 2014, pp. 1-15.
Kiros, et al., "Skip-thought vectors", In Proceedings of Advances in neural information processing systems, Dec. 7, 2015, pp. 1-9.
Lee, Sungjin, "Nudging Neural Conversational Model with Domain Knowledge", In Journal of Computing Research Repository, Nov. 15, 2018, 5 Pages.
Li, et al. "A Persona-based Neural Conversation Model", In Proceedings of the 54th Annual Meeting of the Association or Computational Linguistics, Mar. 19, 2016, 10 Pages.
Pennington, et al., "Glove: Global vectors for word representation", In Proceedings of the Conference on Empirical Methods in Natural Language Processing, Oct. 25, 2014, pp. 1532-1543.
Serban, et al., "Building End-to-end Dialogue Systems Using Generative Hierarchical Neural Network Models", In Proceedings of the Thirteenth AAAI Conference on Artificial Intelligence, Mar. 5, 2016, pp. 3776-3783.
Simard, et al., "Machine teaching: A new paradigm for building machine learning systems", In Journal of Computing Research Repository, Jul. 21, 2017, 14 Pages.
Sordoni, et al., "A Neural Network Approach to Context-Sensitive Generation of Conversational Responses", In Journal of Computing Research Repository, Jun. 22, 2015, 11 Pages.
Vinyals, et al., "A Neural Conversational Model", In Journal of the Computing Research Repository, Jun. 19, 2015, 8 Pages.
Williams, et al., "Hybrid code networks: practical and efficient end-to-end dialog control with supervised and reinforcement learning", In Journal of Computing Research Repository, Feb. 10, 2017, 13 Pages.
Young, et al., "POMDP-based statistical spoken dialog systems: A review", In Proceedings of the IEEE, vol. 101, Issue 5, May 2013, pp. 1160-1179.
Zhao, et al., "Generative encoder-decoder models for task-oriented spoken dialog systems with chatting capability", In Proceedings of the 18th Annual SIGdial Meeting on Discourse and Dialogue, Aug. 15, 2017, pp. 27-36.
"International Search Report and Written Opinion Issued in PCT Application No. PCT/US19/060167", dated Mar. 19, 2020, 11 Pages/

* cited by examiner

NUDGING NEURAL CONVERSATIONAL MODEL WITH DOMAIN KNOWLEDGE

BACKGROUND

Neural conversation models are attractive because one can train a conversational model directly on dialogue examples with minimal labeling. That is, neural conversation models learn how to process conversational dialogues based on a small set of examples, providing a system that is easier to interface with, more intuitive, and generally faster to develop than other bot related conversational models. In fact, there is no need to be an expert when training a neural conversation model; rather, a neural conversation model representing natural conversation for users may be built utilizing representative examples and such examples may be provided in a manner representative of the examples. However, training neural conversation models usually require more examples than other conversational technologies.

However, with a small amount of data, such models often fail to generalize over test data since the models tend to capture spurious features associated with the specific dialogue examples, instead of semantically meaningful domain knowledge. To address the issue of poor generalization, previous techniques focused on providing larger sample sets such that spurious features tend to not be dominant during neural conversation model training. Accordingly, training a neural conversation model with a large amount of dialogue examples generally allows the neural conversation model to understand semantic information such that the neural conversation model can provide a more tailored response in a manner more consistent with what a human would expect. However, collecting large sets of dialogue examples specific to a target domain tends to be really expensive and further increases training time associated with a neural conversation model. Thus, it tends to be impractical to require users to provide thousands of dialogue examples during a neural conversation model development process.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods that provide the ability for any human teacher to transfer domain knowledge to a neural conversation model in the form of natural language rules. That is, systems and methods described herein may incorporate domain knowledge into the neural conversation model instead of asking, or requiring, a large amount of dialogue examples during a training process. Rather, important semantic information may be gleaned from knowledge rules such that, based on domain knowledge incorporated as natural language rules, the conversation model may be nudged, or otherwise biased, in a direction of the provided domain knowledge. Accordingly, the neural conversation system may utilize small dialogue examples for initial model training to detect important features while minimizing the influence of spurious features with the incorporated natural language rules. Thus, rather than utilize a formal language to provide the domain knowledge, which would require an expert, increase costs, and potentially increase time of development, a minimal set of natural language rules may be provided which provides for a less expensive model training process, a faster model training process, and a less complex system, avoiding the great difficulties associated with having to represent something, such as domain knowledge, in a formal language. As one example, a small number of simple rules (for example twenty rules or less), requiring less than a half hour for each domain, may be implemented.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
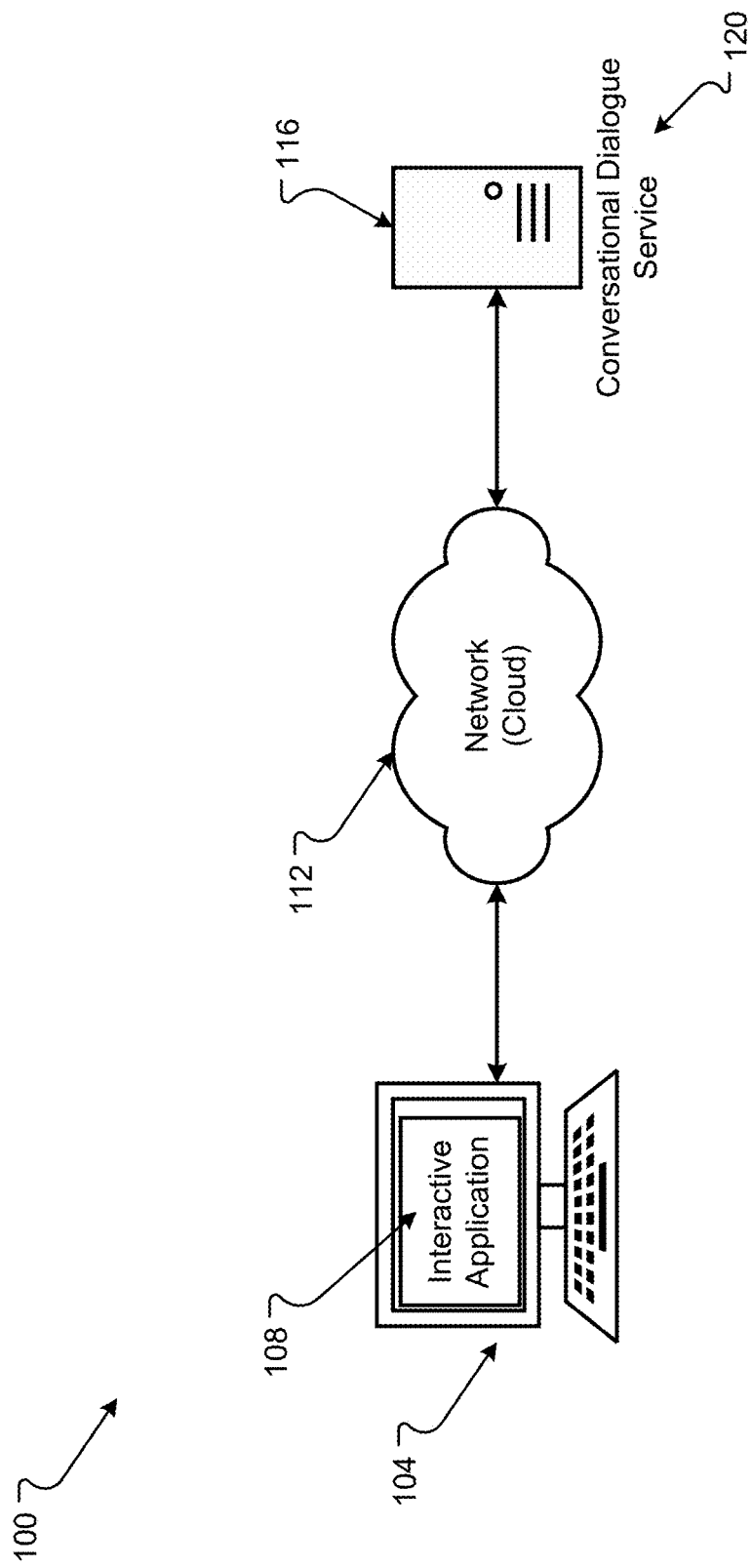
FIG. 1 illustrates conversational system in accordance with the aspects a of the disclosure.

The above specification, examples and data provide a complete description of the manufacture and use of the composition of the invention. Since many embodiments of the invention can be made without departing from the spirit and scope of the invention, the invention resides in the claims hereinafter appended.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In accordance with embodiments of the present disclosure, problems with machine learning are overcome using natural language rules. In machine teaching, the role of the teacher is to transfer knowledge to the learning machine so that the learning machine can generate a useful model. With a teacher's domain knowledge, the teacher can identify some features that are immune to overfitting because they are created independently of the training data. In Table 1, for example, the learning machine might pick the previous system response, i.e. I'm on it, as a key feature in making predictions for a next response because the response "I'm on it" consistently shows up in a limited set of dialogues. But such spurious regularities won't last long as more dialogues become available. In contrast, any human teacher can tell that the user inputs should instead be the key feature despite their varying forms in which they have been received. Thus, if there is an easy way to transfer such knowledge, one can bias the model to rely more on semantically robust features.

In accordance with embodiments of the present disclosure, systems and methods are disclosed which take as input, one or more sets of rules, u-rules and/or s-rules, as part of the neural conversation model. Accordingly, with u-rules, one can suggest what the system should say upon a particular user input, e.g., "Actually I want $cuisine food" →"Sure, is there anything else to update?" That is, u-rules express a particular way of responding in response to an utterance received from a user. U-rules include a dialogue pair, where a first portion of the u-rule is an example user utterance and a second portion of the u-rule is an expected system response. With s-rules, one can encourage the system to follow a typical ordering of system actions, e.g., "what kind of food would you like?" →"what area of town should I search?" Like u-rules, s-rules include system response pairs, where a first portion of a u-rule includes a previous system action and a second portion of the s-rule includes the next system action. Thus, for example, in a restaurant domain, a system may ask about food type first, and then if there are available restaurants for this particular food type, then the system may ask about a number of people for a reservation, a reservation time, or similar item of interest. Accordingly, a preferred order of system actions may be provided as an example dialogue in the natural language rule. Returning back to the example in Table 1, rather than a system responding with "Sure, is there anything else to update?" in response to a user saying "Actually, I want $cuisine food," the system may respond with "what reservation time is most convenient for you?", as this response may be a next system action based on a user provided s-rule.

TABLE 1

. . .
System: I'm on it
User: Actually I would prefer for two people
System: Sure, is there anything else to update?

TABLE 1-continued

. . .
System: I'm on it
User: Actually I want French food
System: Sure, is there anything else to update?

In accordance with embodiments of the present disclosure, a natural language rule (NLR) inferencer may be provided; the NLR inferencer may receive one or more of the s-rules and u-rules as an input for a specific domain or otherwise filter one or more provided s-rules and/or u-rules in accordance with a specific domain. The NLR influencer may then generate higher scores for more desirable system actions according to the provided natural language rules. An implemented conversation model may then take this score as a feature and bias a prediction to favor actions having a higher score.

The conversational model depicted in the present disclosure builds upon the Hybrid Code Network proposed by Williams et al. (Jason D. Williams, Kavosh Asadi, and Geoffrey Zweig); *Hybrid code networks: practical and efficient end-to-end dialog control with supervised and reinforcement learning*; arXiv preprintarXiv:1702.03274; 2017), which is hereby incorporated herein by reference for all that it teaches and for all purposes. The Hybrid Code Network serves as a key component for recent interactive bot development technologies such as Conversation Learner and Rasa. At a high level, the conversation model includes, but is not limited to, five components: sentence encoders; a context RNN; domain-specific software; domain-specific action templates; and a conventional entity extraction module for identifying entity mentions in text. The domain-specific action templates may correspond to a textual communicative action or a reference to another function or action, such as an API call. Candidate action templates may be provided by a developer as part of the model development process and provide a framework for how the model responds in a given domain. A trained sentence encoder may encode a sentence with 4 layer long short-term memory (LSTM) with 1,000 hidden units for each layer. The hidden state from the top layer at the end of the sentence is provided as the sentence representation.

Referring now to FIG. 1, a configuration of a conversational system 100 is depicted in accordance with an embodiment of the present disclosure. The conversational system 100 may include a computing device 104 executing an application 108, where the computing device 104 is connected to or otherwise in communication with a server 116 executing a conversational dialogue service 120. The conversational dialogue service 120 may provide one or more functions in accordance with a conversational model trained on dialogue examples having minimal labeling. The computing device 104 may be in communication with the server 116 through a network or cloud 112. The computing device 104 can be any type of computing device, for example, computing device 800, 900, 902, etc., as may be described in conjunction with FIGS. 8-11. As another non-limiting example, the computing device 104 may be any device configured to allow a user to use an application 108 such as, for example, a smartphone, a tablet computer, a desktop computer, laptop computer device, gaming devices, media devices, smart televisions, multimedia cable/television boxes, smart phone accessory devices, industrial machinery, home appliances, thermostats, tablet accessory devices, personal digital assistants (PDAs), or other internet of things (TOT) devices.

Figure 10:
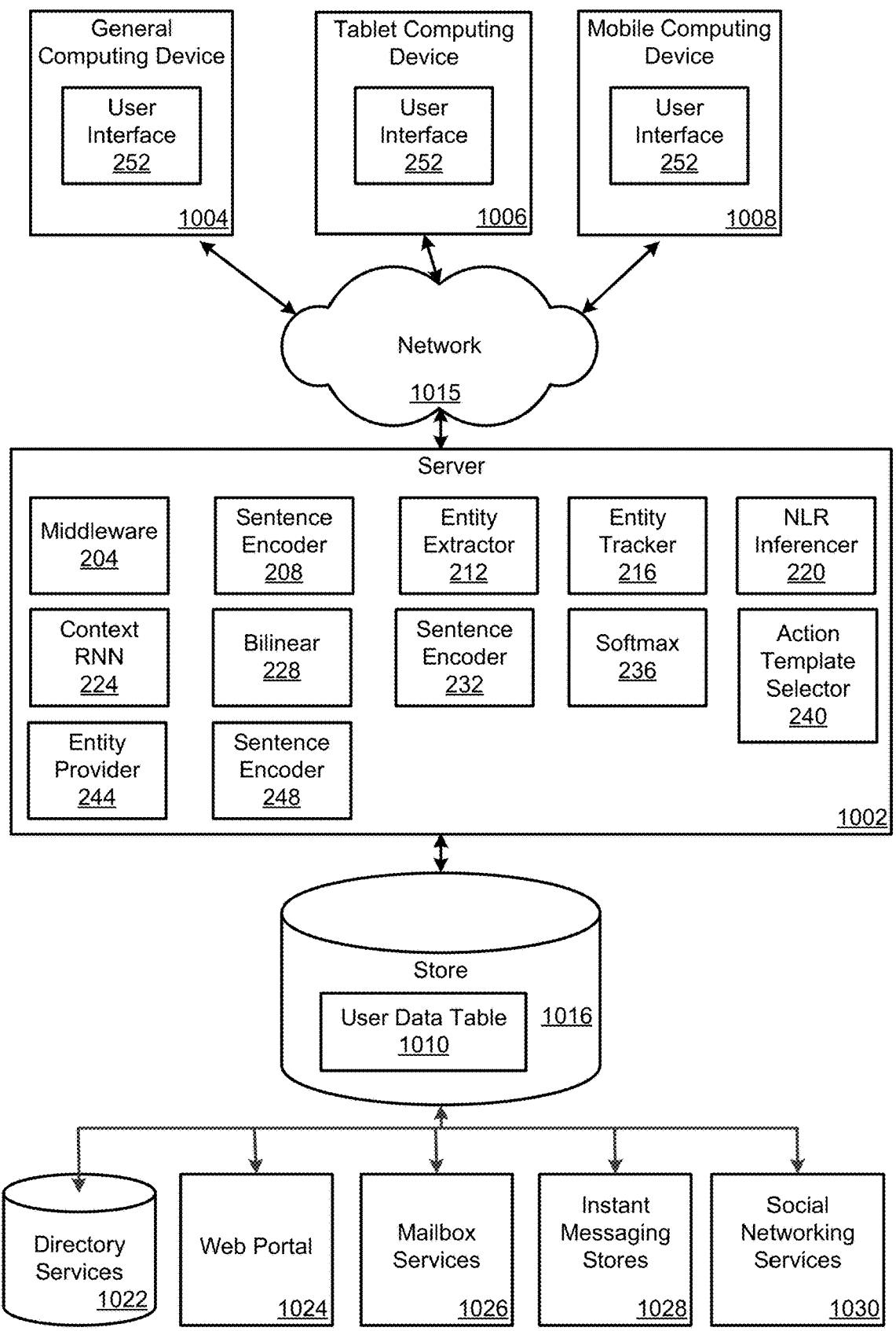
FIG. 10 is a simplified block diagram of a distributed computing system in which aspects of the present disclosure may be practiced.

The network 112, likewise, may be any kind of network interconnection such as a local area network (LAN), a wide area network (WAN), a wireless LAN (WLAN), the Internet, one or more communication channels, etc., for example, network 1015, as described in conjunction with FIG. 10.

The conversational dialogue service 120 may be executed on the server 116 or other type of computing device, for example, server 1002, as described in conjunction with FIG. 10. The application 108 may allow a user to interact with and receive services, information, or otherwise from the server 116, and/or interact with a transaction bot provided by server 116 and/or the conversational dialogue service 120. The user of the computing device 104 may interact with the server 116 via one or more channels. The one or more channels may be any type of communication channels carrying communications for applications including short messaging services (SMS), email services, messaging platforms such as conferencing platforms, social network platforms, text messaging platforms, or any other type of application using text communication. The application 108 may also include any type of application using voice or spoken communications. In various implementations, text may be typed by the user, or transcribed text produced by a speech recognizer, or, also may be translated from another language using an automatic translation service. The user may engage in a one-to-one dialogue with a bot, or the bot could be participating in a dialogue with a plurality of users. The bot could be addressed directly, or the bot could monitor a conversation and respond when it determines a response would be relevant or appropriate. The application 108 may include, or otherwise interact with, reservation applications, retail/purchasing applications, information retrieval applications, or any other type of application that may interact with a user through a dialogue.

Figure 2:
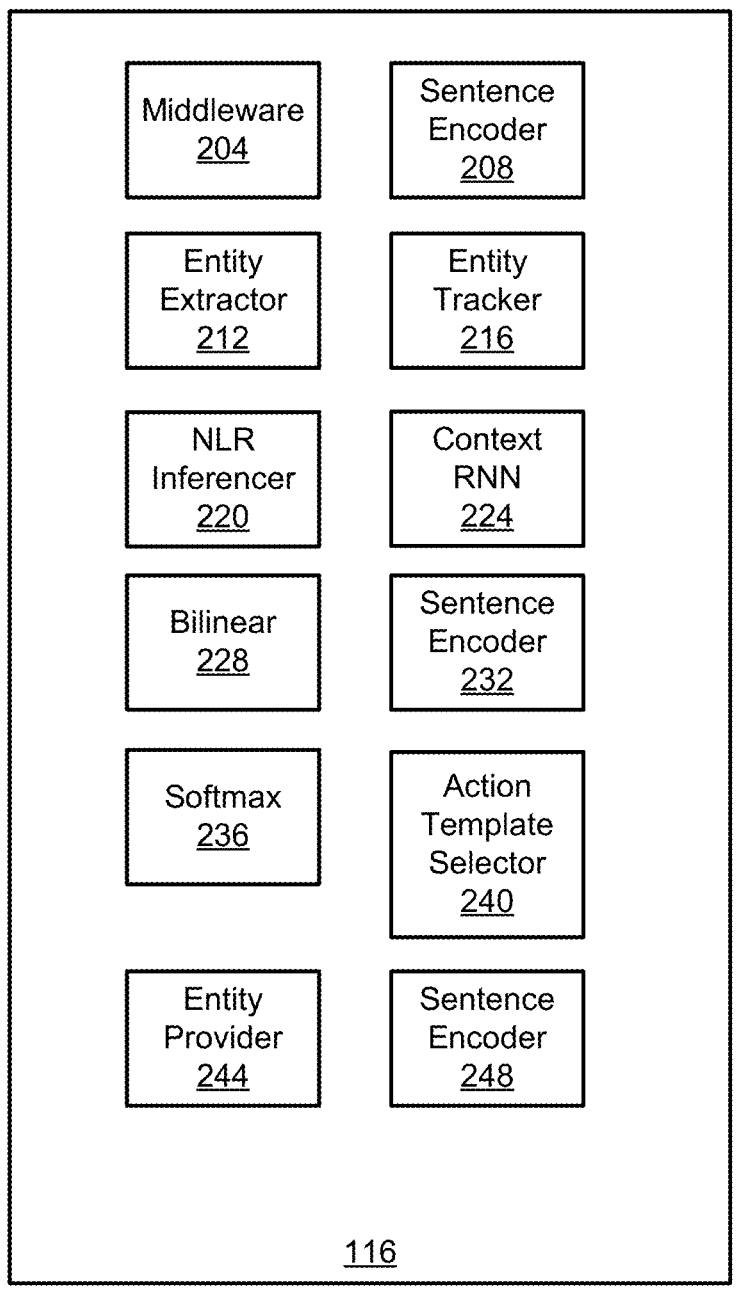
FIG. 2 illustrates components of the conversational system in accordance with the aspects of the disclosure.
Figure 2:
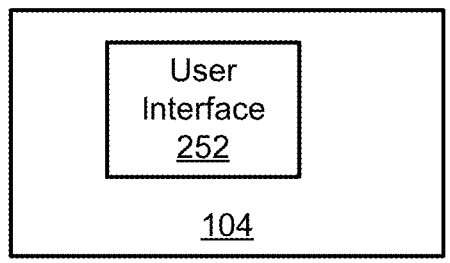

An example configuration of components associated with system 100, which may be embodied in hardware and/or software, may be as shown in FIG. 2. The components may be part of or executed by the computing device 104 and/or the server 116. For example, the computing device 104 may execute one or more of, but not limited to: a user interface 252. The server 116 for example, may execute one or more of, but not limited to: a middleware 204, a sentence encoder 208, an entity extractor 212, an entity tracker 216, a Natural Language Rule (NLR) Inferencer 220, a context RNN, a bilinear 228, a second sentence encoder 232, a softmax 236, an action template selector 240, an entity provider 244, and a third sentence encoder 248. The particular division of components between the computing device 104 and server 116 is not limited to this arrangement but may be reorganized based on the needs of the process, system, etc. Further, there may be more of fewer components than those components 204-252 depicted in FIG. 2. Each of the components 204-252 may conduct functions as described in a non-limiting manner hereinafter.

Middleware 204 may be any component to provide inputs, from a server interface interacting with the computing device 104, to other components 208-248 described herein. Further, the middleware 208 may receive outputs from the various components 208-248 described herein and provide those outputs back to the computing device 104. The middleware 208 can be, for example, an application programming interface (API), or other component that may provide for interactions between the operating system, the client device 104, and/or the components 208-248 described herein.

Figure 4:
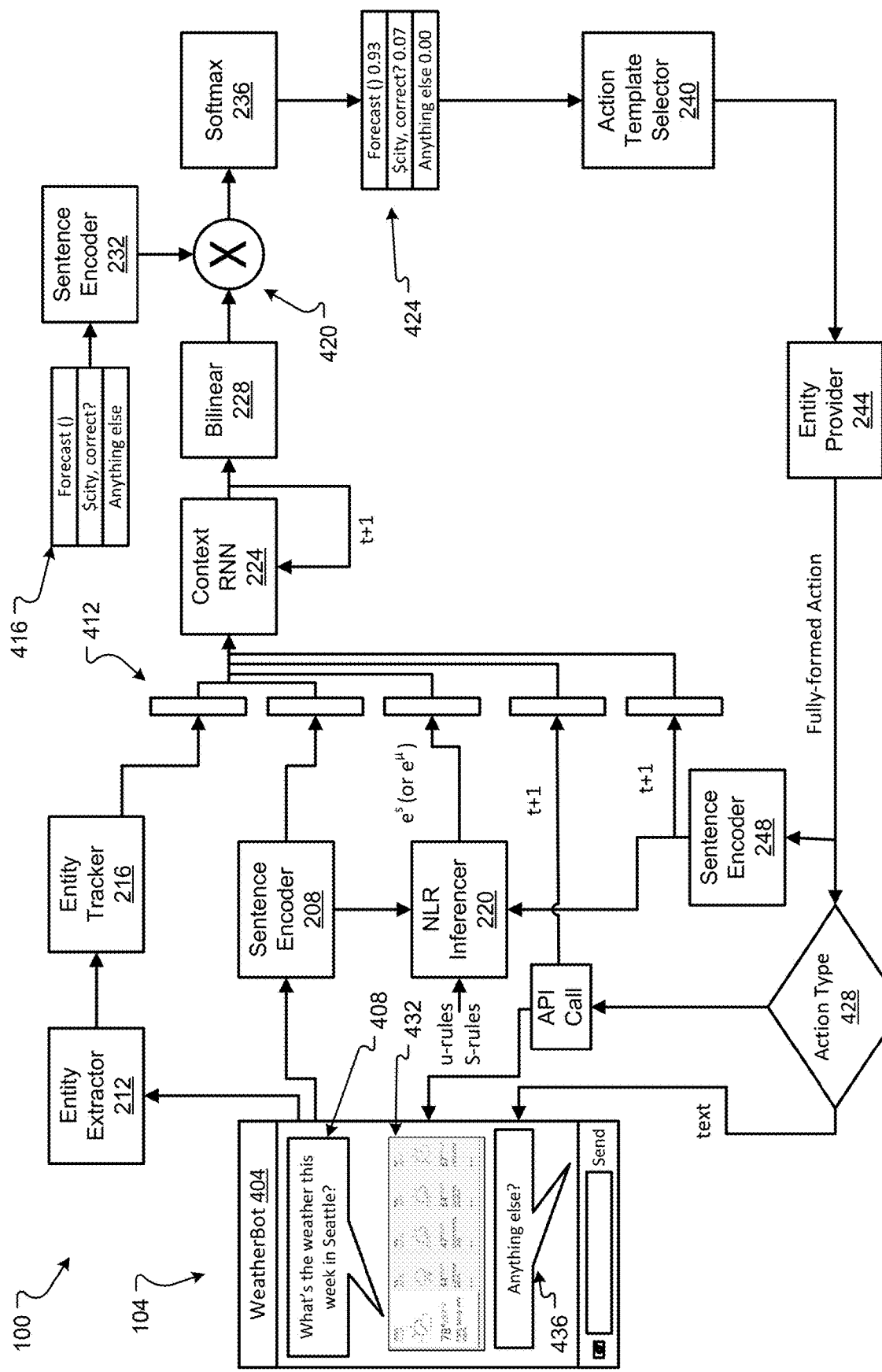
FIG. 4 illustrates additional details of the conversational system in accordance with the aspects of the disclosure.

A user interface 252 may be as described in conjunction with FIG. 4. A user interface 252 may produce a window or other display on a computing device 104 and may receive inputs from a user through one or more human-machine interfaces, e.g., a mouse, a keyboard, etc. Alternatively, or in addition, the user interface may be non-visual in nature and may receive speech inputs from a user and may provide speech outputs to a user. More particularly, the user interface 252 may include any components used to receive communication from a user and provide communication to a user while a user is interacting with the computing device 104. As another example, the user interface 252 may provide and/or receive voice or spoken communications, where text may be typed in by the user, or transcribed text produced by a speech recognizer, or, also may be translated from another language using an automatic translation service.

The functions of entity extractor 104, recurrent neural network 108 and controller 110 of system 104 may be implemented using a one or more servers. In alternative embodiments of FIG. 1, the functions described for a particular functional block in relation to FIG. 1 may be performed in another of the functional blocks of FIG. 1 or divided up between the functional blocks in a different way. The conversational service may be an implementation of a conversation model.

The server 116 may execute one or more sentence encoders 208, 232, and/or 248 for converting one or more sentences of the conversational dialogue service 120 into a sentence representation or embedding. The sentence encoders 208, 232, and/or 248 perform sentence embedding to map words or phrases to vectors of real numbers. For example, sentences may be mathematical embedded from a space with one dimension per word to a continuous vector space with a much lower dimension thereby forming a sentence embedding. As another example, a neurocon may be utilized, where the neurocon is a pre-trained sentence encoder that encodes sentences with a four layer long short-term memory (LSTM) model having 1,000 hidden units for each layer. A hidden state from the top layer at the end of the sentence may be the resulting encoded sentence representation, also referred to as the sentence embedding. Of course, more or less hidden units may be utilized and/or a hidden state corresponding to a desired time step of the LSTM model may be derived from or otherwise acquired from a layer of the neurocon other than the top layer. For example, a hidden state preserving sequential information derived from various layers of the LSTM model other than an output layer may be desired when generating a sentence embedding. In accordance with embodiments of the present disclosure, one or more of the previously described sentence encoders may be implemented utilizing one or more of a recurrent neural network, convolutional neural network, or attention-based neural networks for sentence embedding.

The server 116 may execute one or more entity extractors 212; the entity extractor 212 may identify one or more entities in a received utterance or text. For example, in the query "Will it rain in Seattle on Friday?", an entity extractor 212 may identify "Seattle" as a city, "Friday" as a day, and "rain" as a weather event. As another example, the entity extractor 212 may identify "Denver" as a <city> entity and "Jennifer Jones" as a <name> entity. The entity extractor 212 may also use custom models specific to the user's domain, or may use generic models suitable for many domains. For example, generic models may extract entities such as dates, times, locations, monetary amounts, etc., and the entity extraction 212 may optionally resolve entities to a machine interpretable form. For example, "January" might be resolved to "month=1". The server 116 may execute one or more entity trackers 216; the entity tracker 216 may map text, such as "Jennifer Jones" to a specific location in a storage area, such as a specific row in a database or table. Such tracking information may be utilized to provide context features which may be useful for distinguishing amongst system actions, such as which entities are currently present and which entities are absent.

The server 116 may execute one or more NLR inferencers 220. The NLR inferencer 220 may receive text, or a user utterance embedding, system action embedding and two sets of NLRs, u-rules and s-rules. The NLR inferencer 220 then performs inferencing to yield a vector that represents a soft preference over the set of action templates based on the domain knowledge encoded in the NLRs. The result of the NLR inferencer 220 is then passed to the overall conversational model as features to give it a nudge to consider domain knowledge.

The server 116 may execute one or more context RNNs 244; the context RNN 244 may be utilized to generate a distribution over actions to take. The distribution may be based on the received set of features, where the received set of features may be biased in accordance with the resulting vector, such as the biasing vector, provided from the NLR inferencer 220. The output actions may be represented as a "flat" list, or as a generative process. For example, a generative process might use a second neural network which can generate text, along with the probability of that text. The context RNN 244 may also compute a hidden state, which is retained for a next timestep. The server 116 may also execute a bilinear layer 228, which projects the hidden state, or a vector resulting from the context RNN 244, to a response space yielding a response embedding. The response embedding may be a vector representative of aggregate information output from the context RNN 244 and having a specified dimensionality. The response embedding is used to rank candidate action templates based on a similarity. The candidate action templates may be the same as the domain action templates previously described, but are referred to as a "candidate" in this instance as a single action template of the provided domain action templates will be selected as a "best" match based on the inputs of the conversational mode. To choose a "best" action template, a set of embeddings for each distinct candidate action template are generated, using a sentence encoder, such as the sentence encoder 232. This set of embeddings is then ranked according to a similarity to the response embedding at 420 of FIG. 4, for example. The softmax 236 then generates a probability distribution over the candidate action templates. Based on the resulting distribution, the action template selector 240 may then select a "best" action and pass the selected action template to the entity provider 244, where entities are substituted to map the action template to a fully formed action, for example, "<city>, right?" to "Seattle, right?" The fully formed action may then be provided to a user at the user interface 252 for example.

Figure 3:
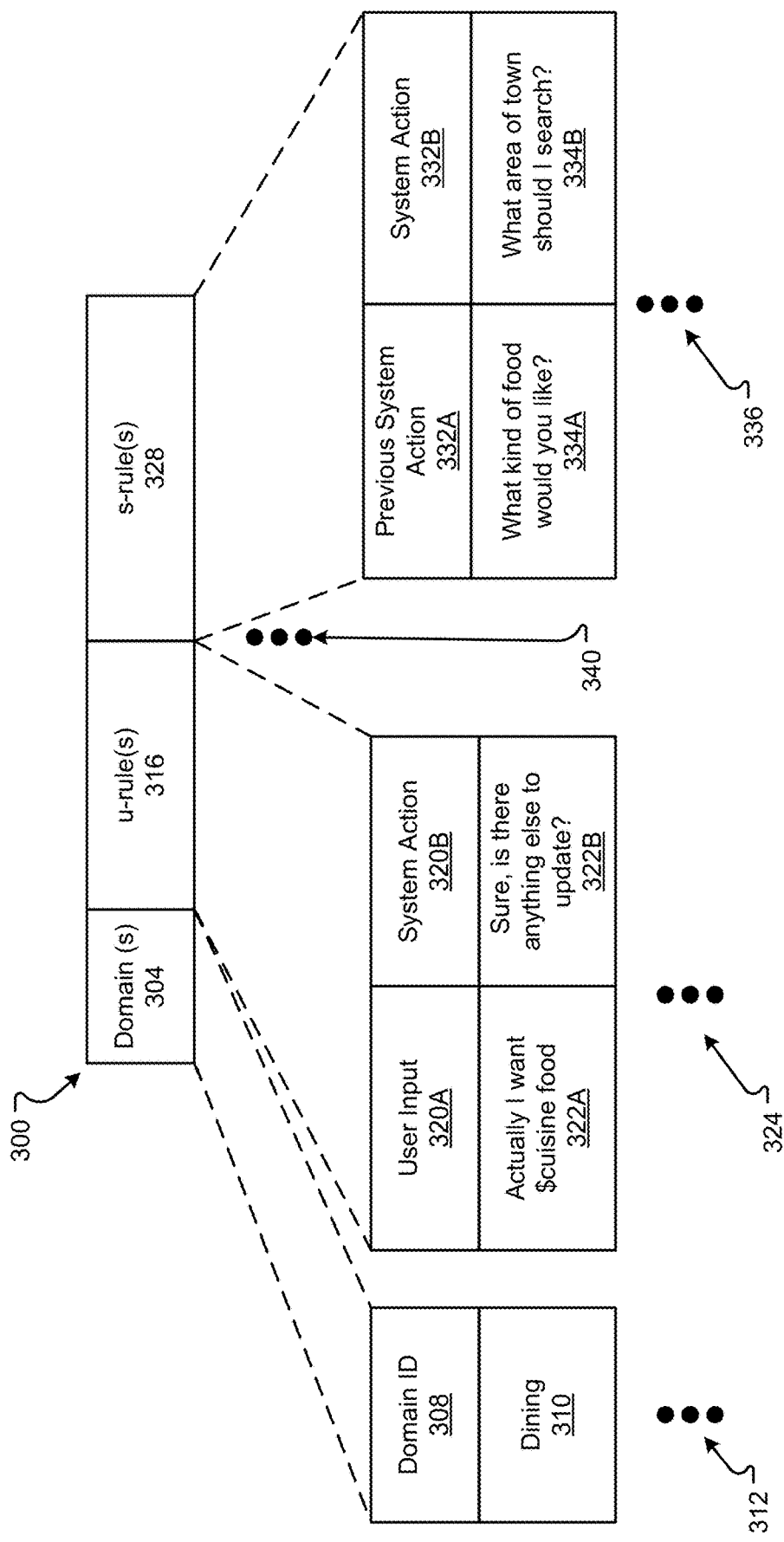
FIG. 3 illustrates an example configuration of a natural language rule data table and/or data structure in accordance with the aspects of the disclosure.

FIG. 3 depicts an example of a configuration of an NLR data table and/or data structure 300 in accordance with embodiments of the present disclosure. The NLR data structure 300 may include a domain identifier 304, a u-rule 316, and/or an s-rule 328. As previously discussed, the u-rule may be a tuple including a pre-condition and a post-condition. The pre-condition for a u-rule 316 may include a user input 320A, such as "actually, I want $cuisine food" as depicted by reference character 322A, where $cuisine food is a food type. The post-condition for a u-rule may include a system action 320B, such as "sure, is there anything else to update?" The s-rule may also be a tuple including a pre-condition and a post-condition. The pre-condition for an s-rule may be a previous system action 332A, such as "What kind of food would you like?" depicted by reference character 334A. The post-condition for an s-rule may be a system action 332B corresponding to a next system action, such as "What area of town should I search?" as depicted by reference character 334B. Each u-rule and/or s-rule may be associated with a domain 304, where the domain may include a domain identifier 308; the domain identifier 308 may be indicative of a type of domain or a category of domain knowledge and may be specific or general in nature. A domain of dining 310 may be a specific and/or general depending on a context of other domains, for instance. As depicted in FIG. 3, there may be additional domains 312, additional u-rules 324, and/or additional s-rules 336 contributing to additional NLRs of the NLR data structure 300. The NLR data structure 300 may be provided to the NLR Inferencer 220.

FIG. 4 depicts an overview with additional details of the conversational system 100 in accordance with embodiments of the present disclosure. As depicted in FIG. 4, an application 108 running on a computing device 104 may provide a user interface 252 depicting one or more information items. As a non-limiting example, a WeatherBot application 404 may be tailored to provide weather in response to a user query. The user may speak and/or input text into the WeatherBot application 404 as an utterance, such as "What's the weather this week in Seattle?" as indicated by reference character 408. The utterance may be provided to the sentence encoder 208 such that an utterance embedding may be produced. The utterance embedding may represent the utterance 408 in vector form and may be provided to the block 412. Moreover, the sentence embedding may be provided to the NLR inferencer 220.

In accordance with embodiments of the present disclosure, the NLR inferencer 220 may receive the utterance embedding from the sentence encoder 208 and a sentence embedding from the sentence encoder 248, where the sentence embedding from the sentence encoder 248 represents text, in vector form, associated with a previous system action. In addition, the NLR inferencer 220 receives u-rules and/or s-rules as previously described. The NLR inferencer 220 may generate a biasing vector $e^s$ or $e^u$, based on the received respective u-rules and/or s-rules and provide the biasing vector to the block 412. $e^s$ may represent a biasing vector derived on the basis of the s-rules, while $e^u$ may represent a biasing vector derived on the basis of the u-rules. In instances where $e^s$ $^{and}$ $e^u$ are concatenated, a single biasing vector may result.

The block 412 may receive features from the entity and/or entity tracking information, an utterance embedding based on a user utterance from the sentence encoder 208, one or more of the biasing vectors $e^s$ or $e^u$ from the NLR inferencer 220, a previously fully-formed action in a sentence embedding from the sentence encoder 248, and content based on an API call. The received embeddings in vector form, may then be combined into a feature vector for input into the context RNN 224, such that an output may be generated. Moreover, the context RNN 224 may retain the hidden state for a next timestep, as indicated by "t+1". The context RNN 224 provides the output to the bilinear 228, which projects the output of the context RNN 224 state to a response state. For example, the bilinear 228 may modify the dimensions of the output of the context RNN 224 to an equal number of distinct action templates. A set of embeddings for each distinct candidate action template 416 may be generated by the Sentence RNN 232 and are ranked according to the similarity to the response embedding, where an embedding may be generated for each item of a candidate action template. A subsequent distribution over the possible candidate action templates 416 is provided at 420 to the Softmax 236 such that a probability distribution over the candidate action templates 416 is generated, as depicted by reference character 424. The "best" action template is then selected by the action template selector 240 based on the candidate action template probability distribution 424. For example, a candidate action template having a highest probability may be selected by the action template selector 240. The selected action template may then be populated with the corresponding entities to form a fully formed action. For example, a <city> tag may be populated with "Seattle."

The fully formed action may then be provided to the sentence encoder 248, as previously described, as well as to the branch control 428. The branch control 428 may branch to one or both of the API call and/or provide a text or other output. In instances where an API call is selected, a corresponding API, or other means for interfacing with functions and features related to a corresponding system, may be called and invoked such that rich content may be rendered at a user interface, such as user interface 252. For example, rich content that includes the weather forecast for Seattle for a specific time period may be rendered on a display of the user interface 252, as indicated by reference character 432. Alternatively, or in addition, such rich content may be converted to speech and provided as an output at the computing device 104. In instances where the action type is text, the action type selector 428 may cause text to be provided to or otherwise rendered to the user. Text such as "Anything else?" (as depicted by reference character 436) may be rendered to the display 252. That is, the rendering of the rich content at the computing device 104 may depict a first type of response, while the rendering of the text may depict a second type of response. Each of the first and second types of responses are biased by the NLR Inferencer 220 and the provided u-rules and/or s-rules.

Figure 5:
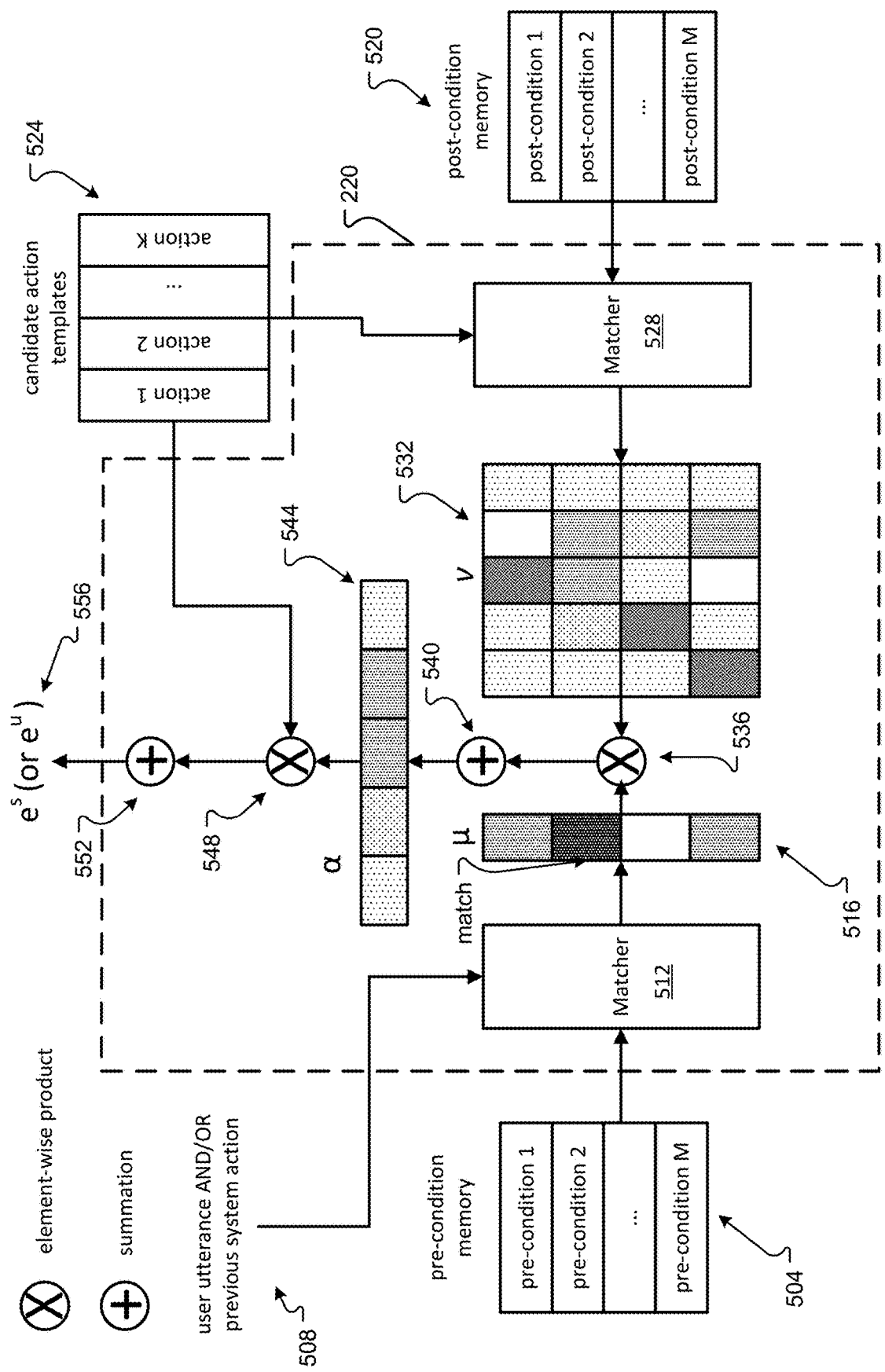
FIG. 5 illustrates additional details of a natural language rule inference in accordance with the aspects of the disclosure.

FIG. 5 depicts additional details of the NLR inferencer 220 in accordance with embodiments of the present disclosure. The NLR inferencer 220 may receive one or more pre-conditions 504 from a storage location, such as a pre-condition memory. The pre-conditions 504 may be associated with one of the previously described pre-conditions 320A and/or 332A of the respective u-rules 316 or s-rules 328. The NLR inferencer 220 may receive one or more post-conditions 520 from a storage location, such as a post-condition memory. The post-conditions 520 may be associated with one of the previously described post-conditions 320B and/or 332B of the respective u-rules 316 or s-rules 328. The utterance 408 and/or the previous system action from the sentence encoder 248 may be provided to the NLR inferencer 220 as input 508 Similar to the utterance embedding provided by the sentence encoder 208, each of the pre-conditions and post-conditions 520 may be provided in as an embedding. The inferencer input 508 may be matched, utilizing matcher 512, against the pre-condition embedding to generate a vector 516 of matching scores, also referred to as vector $\mu$, indicating how relevant each rule is given the inferencer input 508. Similarly, each of the post-condition embeddings is matched, utilizing matcher 528, against all candidate action templates to generate a matrix 532 of matching scores, also referred to as matrix v. The candidate action templates 524 are generally presented as a list of actions from which a next system action is selected, for example ranging from action 1 to action k. In addition, the candidate action templates 524 may be provided as embeddings from a sentence encoder, for example sentence encoder 232.

Each element of the matrix 532 represents a relevance of a candidate action template to a corresponding rule. Thus, the element-wise product 536 of vector $\mu$ and matrix v yields a weighted matrix such that the summation 540 of the weighted matrix over the rows (where the rows are equal to the s-rules and u-rules), results in an $\alpha$ vector 544, representing a relevancy of a candidate action template from a plurality of candidate action templates 524 based on the inferencer input 508 and the rule pairs 504/520. Finally, output vectors $e^s$ and $e^u$ are generated based on s-rules and u-rules respectively, by taking a weighted average over the set of candidate action templates 524 with the weighting being equal to $\alpha$. Accordingly, the NLR inferencer 220 provides a final vector by concatenating vectors $e^s$ and $e^u$. The final vector may be referred to as a biasing vector.

In accordance with the above example, and for purposes of explanation, the current user input 508 matches the pre-condition 2 the best, as indicated by the darkest-shaded vector element in the vector 516. However, none of the available candidate action templates 524 match particularly well with any of the post-conditions from the list of post-conditions 520, as each of the elements represented in the matrix 523 are depicted as being light-shaded in appearance. However, a score is assigned for each candidate action template such that the NLR inferencer 220 may generate an inference, nudge, or bias for use in the conversation system 100 indicating which action is "best" next action based on NLRs representing domain knowledge.

Figure 6A:
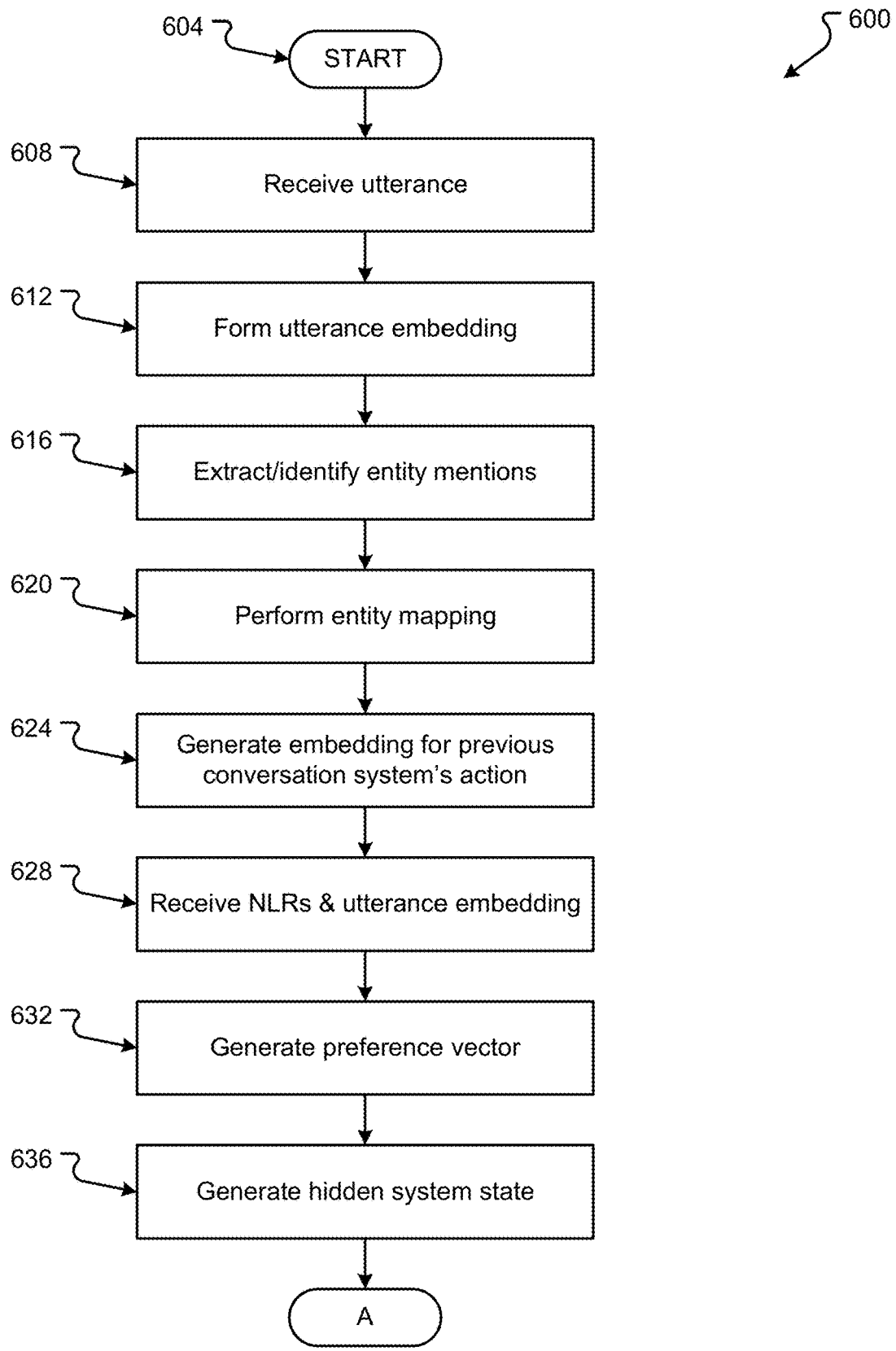
FIGS. 6A-6B illustrate a method for generating a conversational output for a conversation system based on provided domain knowledge in accordance with the aspects of the disclosure.
Figure 6B:
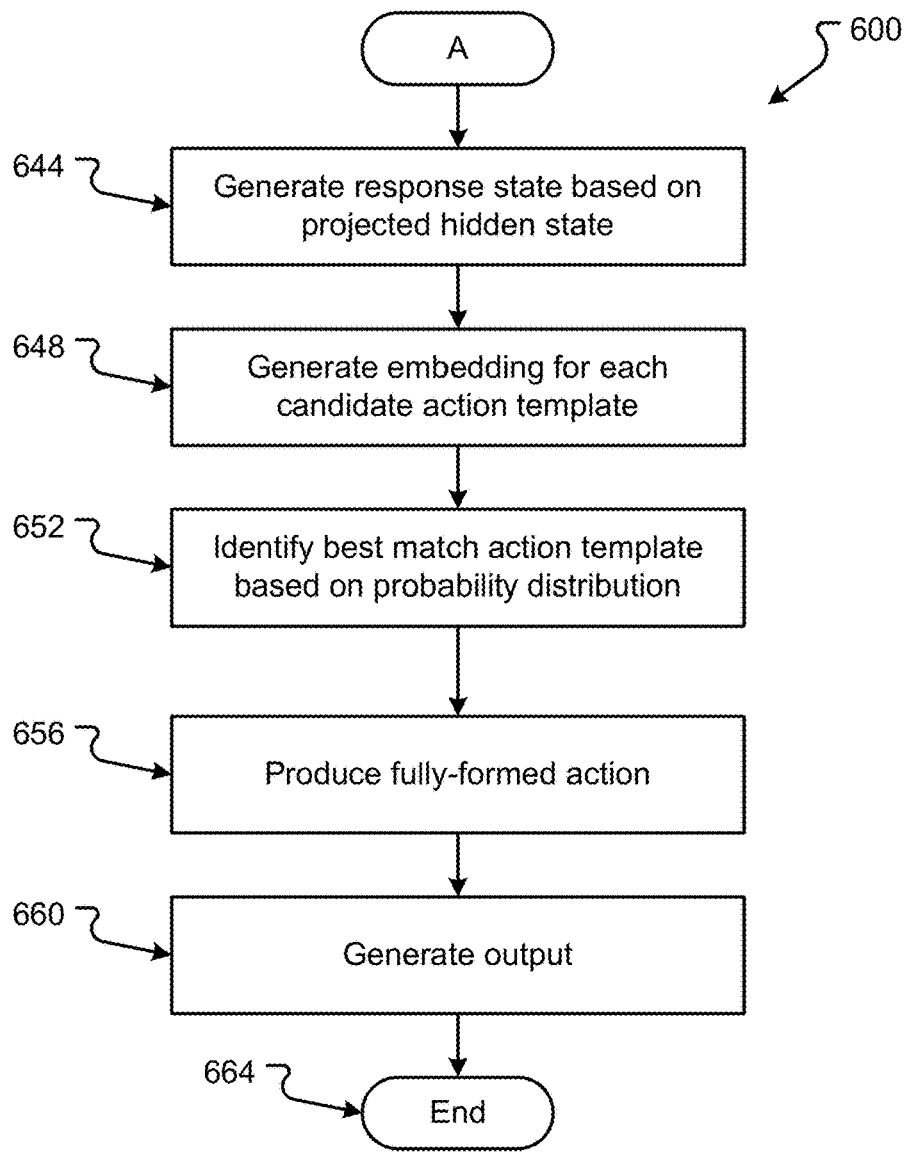

A method 600 for generating a conversational output for a conversation system based on provided domain knowledge may be as shown in FIGS. 6A-6B. A general order for the steps of the method 600 is shown in FIGS. 6A-6B. Generally, the method 600 starts with a start operation 604 and ends with an end operation 664. The method 600 can include more or fewer steps or can arrange the order of the steps differently than those shown in FIGS. 6A-6B. The method 600 can be executed as a set of computer-executable instructions executed by a computer system and encoded or stored on a computer readable medium. Further, the method 600 can be performed by gates or circuits associated with a processor, Application Specific Integrated Circuit (ASIC), a field programmable gate array (FPGA), a system on chip (SOC), or other hardware device. Hereinafter, the method 600 shall be explained with reference to the systems, components, modules, software, data structures, user interfaces, etc. described in conjunction with FIGS. 1-5 and 8-11.

An interface, such as a user interface 252, may receive an utterance from a user at step 608 for example. As previously discussed, the utterance may consist of one or more text inputs, speech inputs, and/or other inputs conveying information from a user. The received utterance may then be formed into an utterance embedding, for example by the sentence encoder 208 at step 612. Moreover, entities may be extracted/identified and further mapped to a storage location at step 616 and 620 respectively utilizing the entity extractor 212 and the entity tracker 216. A previous system action, created by the sentence encoder 248 for example, may be formed into a previous system action embedding and provided to an NLR inferencer 220 at steps 624, where the previous system action embedding is a vector representation of the previous system action. At step 628, NLRs and the utterance embedding may be received at the NLR inferencer 220 at step 628, where a biasing vector, is generated at step 632 and provided to the block 412. Next, at step 636, a hidden system state may be generated based on the biasing vector, entity/entity mappings, previous system action, utterance embedding, and previous system result, such as an API call, by the context RNN 224 and a subsequent response embedding corresponding to the bilinear layer 228 may be generated at step 644. Embeddings for each of the candidate action templates may be generated at step 648 by the sentence encoder 232 and then ranked in accordance with a similarity to the response embedding provided by the bilinear layer 228. A probability distribution over the candidate action templates may be generated by the softmax 236 at step 652 and an action template selector 240 may select a "best" action template. The selected action may then be fully formed by an entity provider 244 at step 656. For example, entities identified at the entity extractor 212 and tracked by the entity tracker 216 may be utilized to populate the selected candidate action template. A resulting output including the populated entities may be generated at step 660. The output may include calling a system API to cause rich content to be rendered and displayed at a computing device 104; alternatively, or in addition, the output may cause text to be rendered at the computing device 104.

Figure 7:
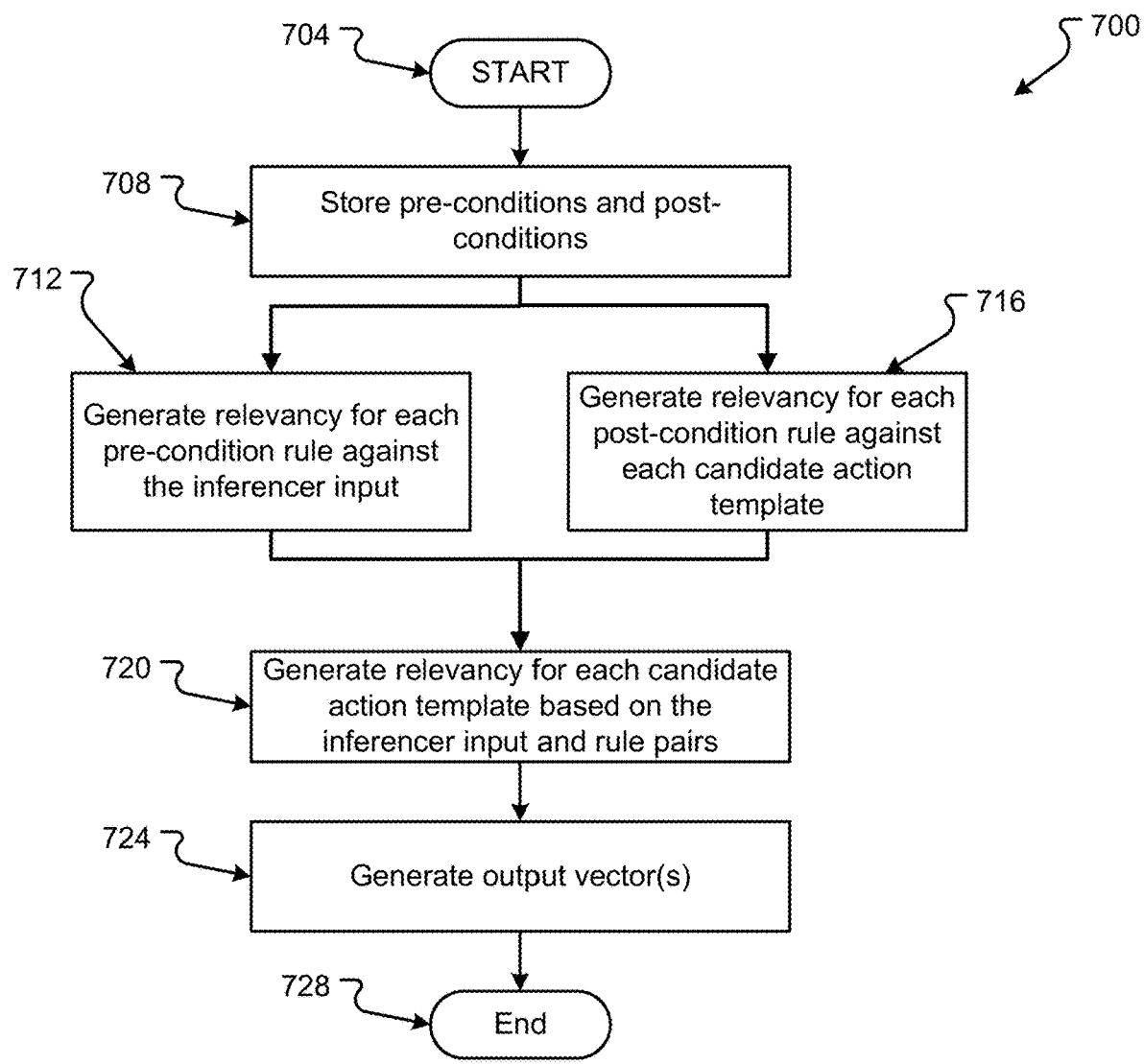
FIG. 7 illustrates a method for generating output vectors from domain knowledge for use as a bias in a conversational system in accordance with the aspects of the disclosure.

A method 700 for generating output vectors from domain knowledge to bias a conversational system may be as shown in FIG. 7. A general order for the steps of the method 700 is shown in FIG. 7. Generally, the method 700 starts with a start operation 704 and ends with an end operation 728. The method 700 can include more or fewer steps or can arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, Application Specific Integrated Circuit (ASIC), a field programmable gate array (FPGA), a system on chip (SOC), or other hardware device. Hereinafter, the method 700 shall be explained with reference to the systems, components, modules, software, data structures, user interfaces, etc. described in conjunction with FIGS. 1-6B and 8-11.

At step 708, NLRs may be received and stored in pre-condition and post-condition storage locations. The NLRs may be the same as or similar to the s-rules and u-rules referenced throughout the present disclosure and/or in conjunction with the NLR data table and/or data structure 300. While FIG. 5 depicts a pre-condition memory 504 and a post-condition memory 520, it should be understood that the pre-condition memory 504 may correspond to the user input 320A and/or previous system action 332A of the u-rule(s) 316 and s-rule(s) 328 respectively. That is, the data structure 300 may be utilized as storage for the pre-condition and post-condition rules. At step 712, a relevancy for each of the precondition rules may be generated against the inferencer input 508 resulting in a vector, such as vector 516. More specifically, the inferencer input 508, which may correspond to an utterance embedding or a previous system action, may be matched, utilizing matcher 512 to the pre-condition embeddings to generate a vector 516 of matching scores μ, indicating how relevant each rule is given the inferencer input 508.

At step 716, a relevancy for each of the post-condition rules may be generated against each candidate action template of the candidate action templates to generate a matrix 532. More specifically, each of the post-condition embeddings is matched, utilizing matcher 528, to candidate action templates to generate a matrix 532 of matching scores, v. The post-condition embeddings generally correspond to the next system action. The candidate action templates 524 are generally presented as a list of actions from which a next system action is selected, for example ranging from action 1 to action k. In addition, the candidate action templates 524 may be provided as embeddings from a sentence encoder. At step 720, a relevancy for each candidate action template may be generated based on the inferencer input and NLR pairs. That is, the element-wise product of the vector 516 and matrix 532 provides a weighted matrix such that the summation of the weighted matrix over the rows (i.e., rules), results in a vector 544 representing a relevancy of a candidate action template from a plurality of candidate action templates 524 based on the inferencer input 508 and the rule pairs 504/520. At step 724, the vector 544 may be applied as a weighted average over the set of candidate action template embeddings producing biasing vectors $e^s$ and $e^u$. The biasing vectors $e^s$ and $e^u$ may be concatenated and provided as an output of the NLR inferencer 220, for example. That is, the concatenated biasing vectors of $e^s$ and $e^u$ may be provided to the system block 412 and is eventually input in the context RNN 224 as part of a feature vector.

Figure 8:
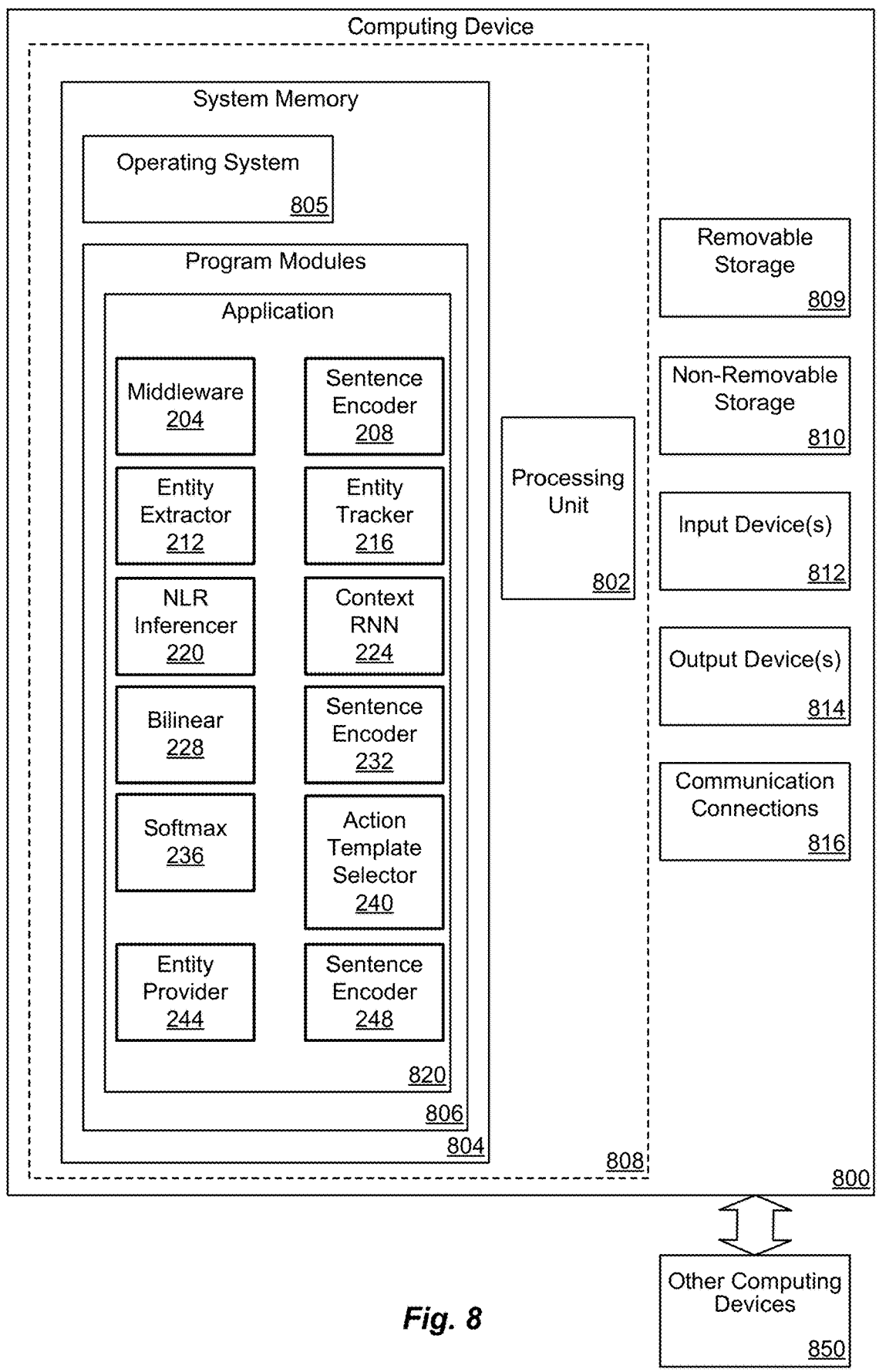
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 808 and one or more program modules 806 suitable for performing the various aspects disclosed herein such as identity provider 824 and attribute inference processor 826. The operating system 808, for example, may be suitable for controlling the operation of the computing device 800. Furthermore, aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 880. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
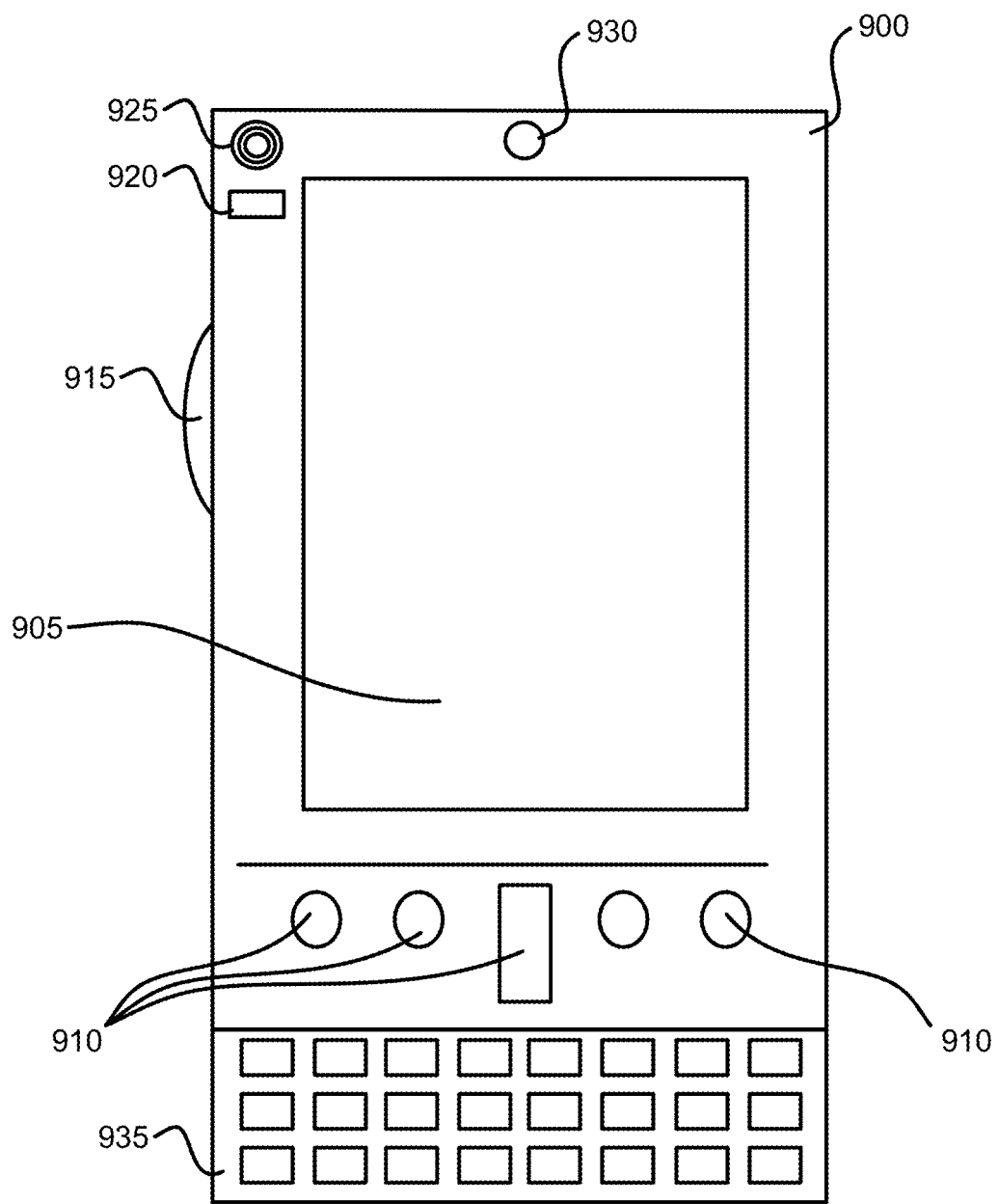
FIG. 9A is a simplified block diagram of a computing device with which aspects of the present disclosure may be practiced.
Figure 9B:
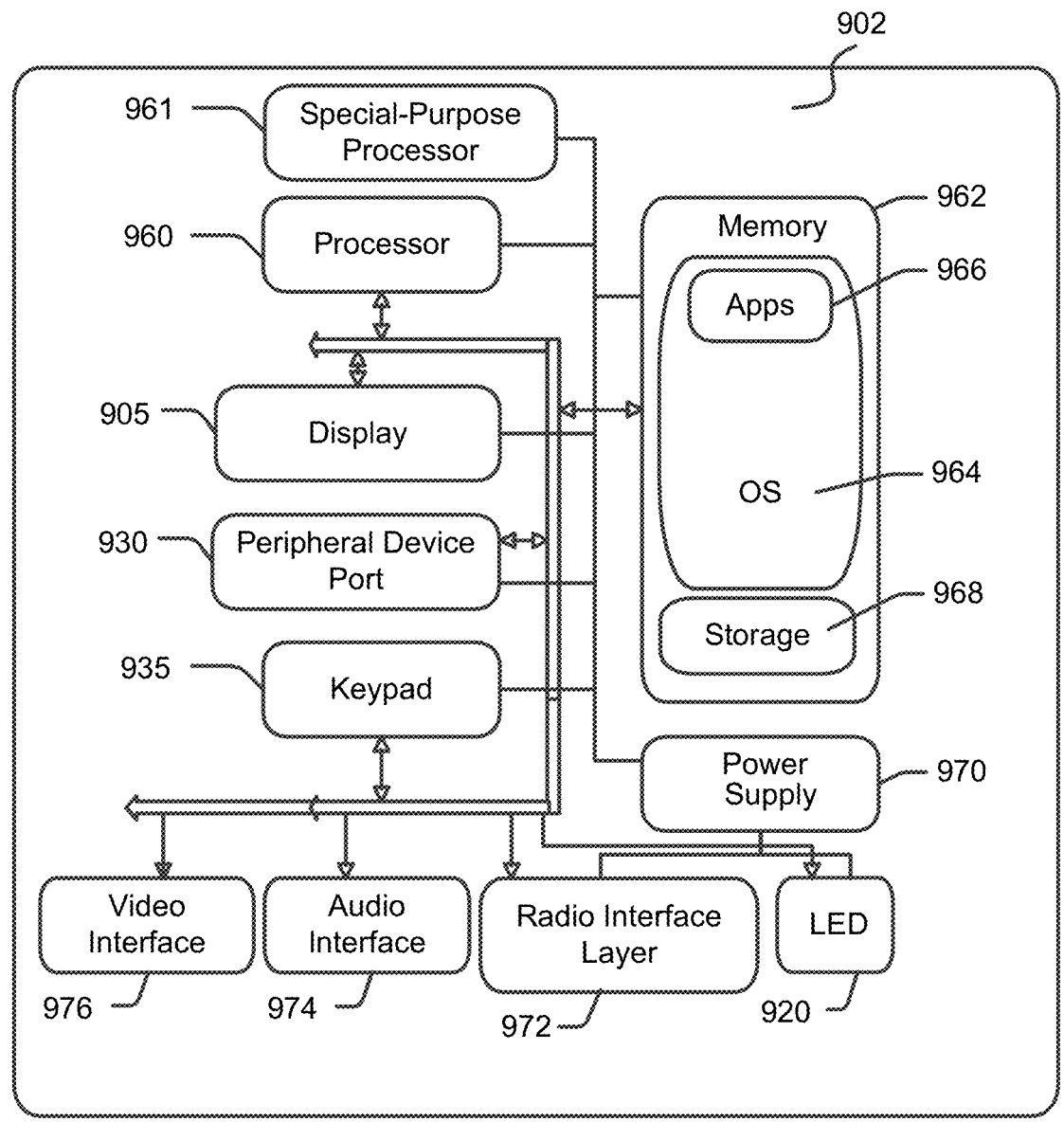
FIG. 9B is another are simplified block diagram of a mobile computing device with which aspects of the present disclosure may be practiced.

FIGS. 9A and 9B illustrate a computing device or mobile computing device 900, for example, a mobile telephone, a smart phone, wearable computer (such as a smart watch), a tablet computer, a laptop computer, and the like, with which aspects of the disclosure may be practiced. In some aspects, the client (e.g., computing system 104) may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some aspects. In yet another alternative aspect, the mobile computing device 900 is a portable phone system, such as a cellular phone. The mobile computing device 900 may also include an optional keypad 935. Optional keypad 935 may be a physical keypad or a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of computing device, a server (e.g., server 112), or a mobile computing device. That is, the computing device 900 can incorporate a system (e.g., an architecture) 902 to implement some aspects. The system 902 can implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated configuration, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with aspects of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. Unified profile API 1021 may be employed by a client that communicates with server device 1002, and/or attribute inference processor 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these configurations of the computing devices may obtain content from the store 1016, in addition to receiving graphical data useable to be either pre-processed at a graphic-originating system, or post-processed at a receiving computing system.

Figure 11:
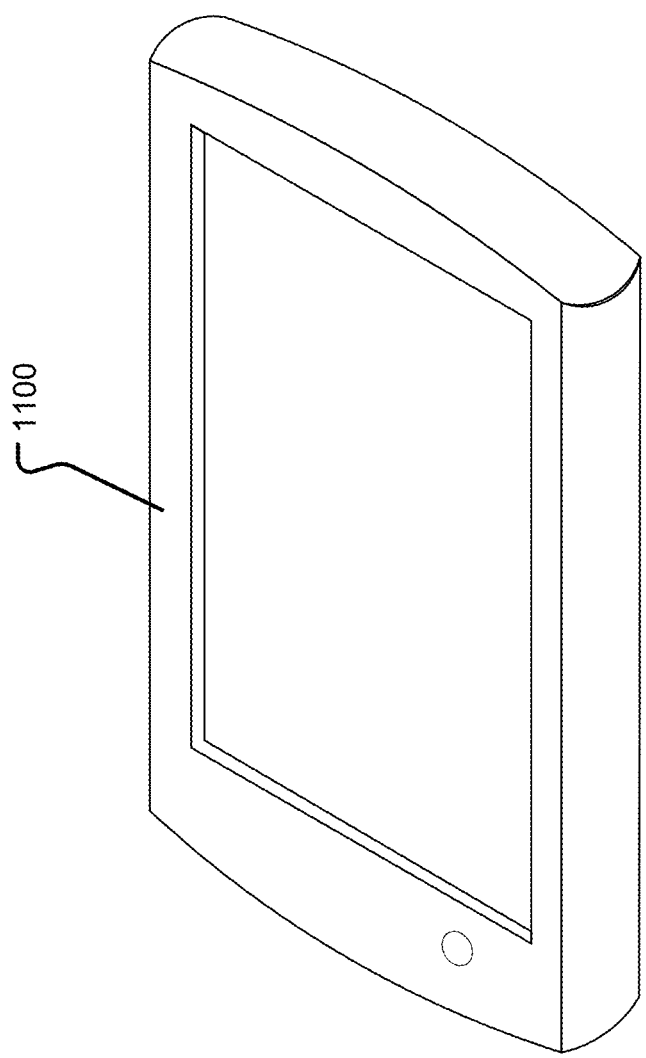
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infrared data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an configuration with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspect of the present disclosure include a computer-implemented method comprising: receiving one or more natural language rules specific to at least one knowledge domain; receiving a set of candidate action templates, each candidate action template of the set of candidate action templates corresponding to at least one system action; receiving at least one input indicative of an utterance or a previous system action; generating a relevancy vector representing a relevancy of each candidate action template of the set of candidate action templates to the at least one input and the one or more rules; and generating a biasing vector as a weighted average of the relevancy vector applied to each candidate action template of the set of candidate action templates.

Any of the one or more above aspects, wherein the one or more natural language rules include a pre-condition and a post-condition.

Any of the one or more above aspects, further comprising generating a relevancy vector representing a relevancy of the pre-condition to the input.

Any of the one or more above aspects, further comprising generating a relevancy matrix representing a relevancy of the post-condition to each of the candidate action template of the set of candidate action templates.

Any of the one or more above aspects, wherein the relevancy vector representing a relevancy of each candidate action template of the set of candidate action templates to the at least one input and the one or more rules is based on the relevancy vector representing the relevancy of the pre-condition to the input and the relevancy matrix.

Any of the one or more above aspects, further comprising biasing a conversational dialogue model with the biasing vector; and selecting a candidate action template based on the biasing vector.

Any of the one or more above aspects, further comprising: causing to be displayed at a display of a computing device, a text output based on the selected candidate action template.

Aspects of the present disclosure include a system comprising: one or more processors; and memory in communication with the one or more processors, the memory including computer-executable instructions, that when executed by the one or more processors, cause the one or more processors to: receive an utterance embedding as a system input; receive one or more natural language rules specific to at least one knowledge domain; generate a relevancy vector representing a relevancy of one or more candidate action templates to the system input and the one or more rules; generate a biasing vector as a weighted average of the relevancy vector applied to the one or more candidate action templates; and select a candidate action template based on the biasing vector.

Any of the one or more above aspects, wherein the one or more natural language rules include a pre-condition and a post-condition.

Any of the one or more above aspects, wherein the computer-executable instructions, when executed by the one or more processors, cause the one or more processors to generate a system action based on the selected candidate action template.

Any of the one or more above aspects, wherein the computer-executable instructions, when executed by the one or more processors, cause the one or more processors to: receive the generated system action as a second system input; generate a second relevancy vector representing a relevancy of the one or more candidate action templates to the second system input and the one or more rules; generate a second biasing vector as a weighted average of the second relevancy vector applied to the one or more candidate action templates; and select a second candidate action template based on the second biasing vector.

Any of the one or more above aspects, wherein the pre-condition is a previous system action and the post-condition is a system action.

Any of the one or more above aspects, wherein the pre-condition is a user input and the post-condition is a system action.

Any of the one or more above aspects, wherein the computer-executable instructions, when executed by the one or more processors, cause the one or more processors to cause to be displayed at a display of a computing device, a text output based on the selected candidate action template.

Aspects of the present disclosure include a computer storage medium comprising computer-executable instructions stored thereon that, when executed by at least one processor, perform a method comprising: receiving one or more natural language rules specific to at least one knowledge domain; receiving a set of candidate action templates, each candidate action template of the set of candidate action templates corresponding to at least one system action; receiving at least one input indicative of an utterance or a previous system action; generating a relevancy vector representing a relevancy of each candidate action template of the set of candidate action templates to the at least one input and the one or more rules; and generating a biasing vector as a weighted average of the relevancy vector applied to each candidate action template of the set of candidate action templates.

Any of the one or more above aspects, wherein the one or more natural language rules include a pre-condition and a post-condition.

Any of the one or more above aspects, further comprising: generating a relevancy vector representing a relevancy of the pre-condition to the input; and generating a relevancy matrix representing a relevancy of the post-condition to each of the candidate action template of the set of candidate action templates.

Any of the one or more above aspects, wherein the relevancy vector representing a relevancy of each candidate action template of the set of candidate action templates to the at least one input and the one or more rules is based on the relevancy vector representing the relevancy of the pre-condition to the input and the relevancy matrix.

Any of the one or more above aspects, further comprising: biasing a conversational dialogue model with the biasing vector; and selecting a candidate action template based on the biasing vector.

Any of the one or more above aspects, further comprising: causing to be displayed at a display of a computing device, a text output based on the selected candidate action template.

Any one or more of the aspects as substantially disclosed herein.

Any one or more of the aspects as substantially disclosed herein optionally in combination with any one or more other aspects as substantially disclosed herein.

One or means adapted to perform any one or more of the above aspects as substantially disclosed herein.

What is claimed is:

1. A computer-implemented method comprising:
receiving a natural language rule specific to at least one knowledge domain, the natural language rule including an expected system response to an input;
receiving a set of candidate action templates, each candidate action template of the set of candidate action templates corresponding to at least one system action;
receiving an input indicative of an utterance or a previous system action;
generating a relevancy vector representing a relevancy of each candidate action template of the set of candidate action templates to the input indicative of the utterance or the previous system action and the natural language rule;
generating a biasing vector as a weighted representation of the relevancy vector for each candidate action template of the set of candidate action templates; and
biasing a conversational dialogue model with the biasing vector.

2. The computer-implemented method of claim 1, wherein the natural language rule includes a pre-condition and a post-condition.

3. The computer-implemented method of claim 2, further comprising:
generating a relevancy vector representing a relevancy of the pre-condition to the input indicative of the utterance or the previous system action.

4. The computer-implemented method claim 3, further comprising:
generating a relevancy matrix representing a relevancy of the post-condition to each candidate action template of the set of candidate action templates.

5. The computer-implemented method of claim 4, wherein the relevancy vector representing a relevancy of each candidate action template of the set of candidate action templates to the input indicative of the utterance or the previous system action and the natural language rule is based on the relevancy vector representing the relevancy of the pre-condition to the input and the relevancy matrix.

6. The computer-implemented method of claim 1, wherein biasing a conversational dialogue model with the biasing vector includes selecting an action based on the biasing vector.

7. The computer-implemented method of claim 6, further comprising:
causing to be displayed at a display of a computing device, a text output based on the selected action.

8. A system comprising:
one or more processors; and
memory in communication with the one or more processors, the memory including computer-executable instructions, that when executed by the one or more processors, cause the one or more processors to:
receive an utterance embedding as a system input;
receive a natural language rule specific to at least one knowledge domain, the natural language rule including an expected system response to an input;
generate a relevancy vector representing a relevancy of one or more candidate action templates to the system input and the natural language rule;
generate a biasing vector as a weighted representation of the relevancy vector for the one or more candidate action templates; and
select a candidate action template of the one or more candidate action templates based on the biasing vector.

9. The system of claim 8, wherein the natural language rule includes a pre-condition and a post-condition.

10. The system of claim 9, wherein the computer-executable instructions, when executed by the one or more processors, cause the one or more processors to generate a system action based on the selected candidate action template.

11. The system of claim 10, wherein the computer-executable instructions, when executed by the one or more processors, cause the one or more processors to:
receive the generated system action as a second system input;
generate a second relevancy vector representing a relevancy of the one or more candidate action templates to the second system input and the natural language rule;
generate a second biasing vector as a weighted representation of the second relevancy vector applied to the one or more candidate action templates; and
select a second candidate action template based on the second biasing vector.

12. The system of claim 11, wherein the pre-condition is a previous system action and the post-condition is a system action.

13. The system of claim 12, wherein the pre-condition is a user input and the post-condition is a system action.

14. The system of claim 8, wherein the computer-executable instructions, when executed by the one or more processors, cause the one or more processors to cause to be displayed at a display of a computing device, a text output based on the selected candidate action template.

15. A computer-storage device comprising computer-executable instructions stored thereon that, when executed by at least one processor, perform a method comprising:
receiving a natural language rule specific to at least one knowledge domain, the natural language rule including an expected system response to an input;
receiving a set of candidate action templates, each candidate action template of the set of candidate action templates corresponding to at least one system action;
receiving an input indicative of an utterance or a previous system action;
generating a relevancy vector representing a relevancy of each candidate action template of the set of candidate action templates to the input indicative of the utterance or the previous system action and the natural language rule;
generating a biasing vector as a weighted representation of the relevancy vector for each candidate action template of the set of candidate action templates; and
biasing a conversational dialogue model with the biasing vector.

16. The computer-storage device of claim 15, wherein the natural language includes a pre-condition and a post-condition.

17. The computer-storage device device of claim 16, further comprising:
   generating a relevancy vector representing a relevancy of the pre-condition to the input indicative of the utterance or the previous system action; and
   generating a relevancy matrix representing a relevancy of the post-condition to each of the candidate action template of the set of candidate action templates.

18. The computer-storage device device of claim 17, wherein the relevancy vector representing a relevancy of each candidate action template of the set of candidate action templates to the input indicative of the utterance or the previous system action and the natural language rule is based on the relevancy vector representing the relevancy of the pre-condition to the input indicative of the utterance or the previous system action and the relevancy matrix.

19. The computer-storage device of claim 15, wherein biasing a conversational dialogue model with the biasing vector includes selecting a candidate action template based on the biasing vector.

20. The computer-storage device of claim 19, further comprising:
   causing to be displayed at a display of a computing device, a text output based on the selected candidate action template.

* * * * *